(12) United States Patent
Lee et al.

(10) Patent No.: US 8,315,034 B2
(45) Date of Patent: Nov. 20, 2012

(54) MULTILAYER CHIP CAPACITOR WITH IMPROVED EQUIVALENT SERIES RESISTANCE

(75) Inventors: Byoung Hwa Lee, Gyunggi-do (KR); Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co. Ltd., Gyunngi-Do (KR)

( * ) Notice: Subject to any disclaimer, the term of this patent is extended or adjusted under 35 U.S.C. 154(b) by 501 days.

(21) Appl. No.: 12/245,856

(22) Filed: Oct. 6, 2008

(65) Prior Publication Data

US 2009/0244803 A1 Oct. 1, 2009

(30) Foreign Application Priority Data

Apr. 1, 2008 (KR) .................... 10-2008-0030382

(51) Int. Cl.
*H01G 4/228* (2006.01)
*H01G 4/06* (2006.01)
*H01G 4/38* (2006.01)

(52) U.S. Cl. .................... 361/306.3; 361/321.2; 361/328

(58) Field of Classification Search ............ 361/301.4, 361/306.3, 321.2, 309, 303, 306.1, 310, 329, 361/330, 328

See application file for complete search history.

(56) References Cited

U.S. PATENT DOCUMENTS

| | | | |
|---|---|---|---|
| 4,814,940 A * | 3/1989 | Horstmann et al. | 361/309 |
| 5,880,925 A | 3/1999 | Dupre et al. | |
| 6,038,121 A * | 3/2000 | Naito et al. | 361/303 |
| 6,407,904 B1 | 6/2002 | Kuroda et al. | |
| 6,765,781 B2 * | 7/2004 | Togashi | 361/306.3 |
| 7,149,071 B2 * | 12/2006 | Mosley | 361/306.3 |
| 7,248,459 B2 * | 7/2007 | Azodi | 361/328 |
| 7,251,115 B2 | 7/2007 | Togashi | |
| 7,310,217 B2 * | 12/2007 | Takashima et al. | 361/306.3 |

(Continued)

FOREIGN PATENT DOCUMENTS

JP 01312816 A * 12/1989

(Continued)

OTHER PUBLICATIONS

Korean Office Action, and English translation thereof, issued in Korean Patent Application No. 10-2008-0030382 dated Jun. 26, 2012.

*Primary Examiner* — David M Sinclair
(74) *Attorney, Agent, or Firm* — McDermott Will & Emery LLP

(57) ABSTRACT

A multilayer chip capacitor includes a capacitor body including a first capacitor part and a second capacitor part, first and second external electrodes respectively formed on first and second longer side faces of the capacitor body, and third and fourth external electrodes respectively formed on first and second shorter side faces of the capacitor body. The first capacitor part includes first and second internal electrodes of opposite polarity, and the second capacitor part includes third and fourth internal electrodes of opposite polarity. The first to fourth internal electrodes each have one lead. The first to fourth external electrodes are respectively connected to the leads of the first to fourth internal electrodes. A series resonance frequency of the first capacitor part is different from that of the second capacitor part. Equivalent series resistance (ESR1) of the first capacitor part and the equivalent series resistance (ESR2) of the second capacitor part satisfy ERS1≧20 mΩ and 0.7(ESR1)≦ESR2≦1.3(ESR1).

6 Claims, 6 Drawing Sheets

U.S. PATENT DOCUMENTS

| | | | | |
|---|---|---|---|---|
| 7,369,395 B2 * | 5/2008 | Togashi | ............ | 361/303 |
| 7,369,396 B2 * | 5/2008 | Maliakal | ............ | 361/311 |
| 7,433,172 B2 * | 10/2008 | Togashi | ............ | 361/306.1 |
| 7,436,681 B2 * | 10/2008 | Tanaka | ............ | 361/766 |
| 7,466,535 B2 * | 12/2008 | Takashima et al. | ............ | 361/306.3 |
| 7,589,954 B2 * | 9/2009 | Kusano et al. | ............ | 361/321.4 |
| 7,646,585 B2 * | 1/2010 | Aoki | ............ | 361/306.1 |
| 7,821,768 B2 * | 10/2010 | Kanno | ............ | 361/281 |
| 2007/0121275 A1 | 5/2007 | Takashima et al. | | |
| 2008/0204969 A1 | 8/2008 | Takashima et al. | | |
| 2008/0225463 A1 * | 9/2008 | Takashima et al. | ............ | 361/306.3 |

FOREIGN PATENT DOCUMENTS

| | | |
|---|---|---|
| JP | 03131008 A * | 6/1991 |
| JP | 2007-142295 | 6/2007 |
| KR | 10-2007-0053800 | 5/2007 |

* cited by examiner

MULTILAYER CHIP CAPACITOR WITH IMPROVED EQUIVALENT SERIES RESISTANCE

CROSS-REFERENCE TO RELATED APPLICATIONS

This application claims the priority of Korean Patent Application No. 2008-0030382 filed on Apr. 1, 2008, in the Korean Intellectual Property Office, the disclosure of which is incorporated herein by reference.

BACKGROUND OF THE INVENTION

1. Field of the Invention

The present invention relates to a multilayer chip capacitor, and more particularly, to a multilayer chip capacitor, which is suitable to be used as a decoupling capacitor of a power distribution network of a micro processor unit (MPU), can improve equivalent series resistance (ESR), and can maintain a constant impedance around a series resonance frequency (SRF).

2. Description of the Related Art

An operating frequency for a high-speed microprocessor unit (MPU) is steadily increasing, leading to an increase in current consumption, and an operating voltage for an MPU chip is decreasing. Thus, it becomes more difficult to suppress noise of a DC supply voltage, which occurs due to a sudden fluctuation of a load current of the MPU, below a certain level, generally, 5 ~10%. A multilayer chip capacitor for decoupling is being widely used in a power distribution network (PDN) of the MPU in order to remove the voltage noise. The multilayer chip capacitor used as a decoupling capacitor suppresses voltage noise by supplying a current to a central processing unit (i.e., an MPU chip) at the time of the sudden fluctuation of the load current.

The load current fluctuates even more rapidly with a further increase in operating frequency of the MPU. Therefore, a decoupling capacitor is required to have higher capacitance, higher equivalent series resistance (ESR) and lower equivalent series inductance (ESL), so that a low and constant impedance of the power distribution network can be maintained in a wide frequency range. This can ultimately contribute to suppressing the voltage noise caused by the sudden fluctuation of the load current.

To satisfy the low ESL characteristic required in a decoupling capacitor used for the PDN of the MPU, modifications in locations or shapes of external electrodes or shapes of internal electrodes have been proposed. For example, U.S. Pat. Nos. 5,880,925 and 6,407,904 disclose a method for reducing the ESL and changing a current path within a capacitor by disposing leads of first and second internal electrodes of opposite polarity adjacent to each other in an interdigitated arrangement.

Such relate dart techniques may contribute to reduction of the ESL, but undesirably cause the ESR to decrease. The capacitor having the aforementioned structure may be helpful in lowering the high-frequency impedance. However, because of the insufficient ESR, the capacitor fails to maintain the low and constant impedance in the PDN.

To overcome the insufficient ESR, a method for implementing high ESR by using a high-resistance electrical material for an external electrode or an internal electrode has been proposed. However, if a high-resistance external electrode is used, a localized heat spot resulting from current concentration caused by a pinhole within the external electrode must be prevented, and it becomes difficult to precisely adjust the ESR. Also, if an internal electrode of a high-resistance material that must match with a ceramic material is used, the high-resistance material of the internal electrode must be changed continuously according to improvements or modifications in the ceramic material for a higher capacitance of a capacitor. This may cause the unit cost of a product to increase.

U.S. Pat. No. 7,251,115 discloses a capacitor that can achieve the low impedance over a wide frequency range by disposing two capacitors having different capacities within one capacitor body. However, as disclosed in this application, the constant impedance cannot be maintained around each series resonance frequency (SRF), and thus the stability of a power circuit degrades.

SUMMARY OF THE INVENTION

An aspect of the present invention provides a multilayer chip capacitor which has a relatively small number of terminals and can maintain the low and constant magnitude of an impedance of a power distribution network in a wide frequency range.

According to an aspect of the present invention, there is provided a multilayer chip capacitor including: a capacitor body having first and second longer side faces facing each other and first and second shorter side faces facing each other, having a stacked structure in which a plurality dielectric layers are stacked, and including a first capacitor part and a second capacitor part stacked in a stacked direction; first and second external electrodes respectively formed on the first and second longer side faces and having opposite polarity; and third and fourth external electrodes respectively formed on the first and second shorter side faces and having opposite polarity. The first capacitor part includes first and second internal electrodes of opposite polarity facing each other with the dielectric layer located between each facing set of the first and second internal electrodes. The first internal lead has only one lead extending to the first longer side face. The second internal electrode has only one lead extending to the second longer side face. The second capacitor part includes third and fourth internal electrodes of opposite polarity facing each other with the dielectric layer between each facing set of the third and fourth internal electrodes. The third internal electrode has only one lead extending to the first shorter side face. The fourth internal electrode has only one lead extending to the second shorter side face. The first and second external electrodes are respectively connected to the leads of the first and second internal electrodes of the first capacitor part. The third and fourth external electrodes are respectively connected to the leads of the third and fourth internal electrodes of the second capacitor part. A series resonance frequency of the first capacitor part is different from a series resonance frequency of the second capacitor part. Equivalent series resistance (ESR1) of the first capacitor part and equivalent series resistance (ESR2) of the second capacitor part satisfy ERS1≧20 mΩ, and 0.7(ESR1)≦ESR2≦1.3(ESR1).

The equivalent series resistance of the first capacitor part may be substantially equal to the equivalent series resistance of the second capacitor part.

The first capacitor part may be disposed at a lower end in the capacitor body, and the second capacitor part may be disposed on the first capacitor part.

The first capacitor part may have portions respectively disposed at upper and lower ends within the capacitor body, and the second capacitor part may be disposed between the portions of the first capacitor part.

The portions of the first capacitor part may be symmetrically disposed in the stacked direction with the second capacitor part located therebetween, and the multilayer chip capacitor may have upper and lower portions which are symmetrical to each other.

Equivalent series inductance per layer provided by one facing set of the first and second internal electrodes within the first capacitor part may be smaller than equivalent series inductance per layer provided by one facing set of the third and fourth internal electrodes within the second capacitor part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
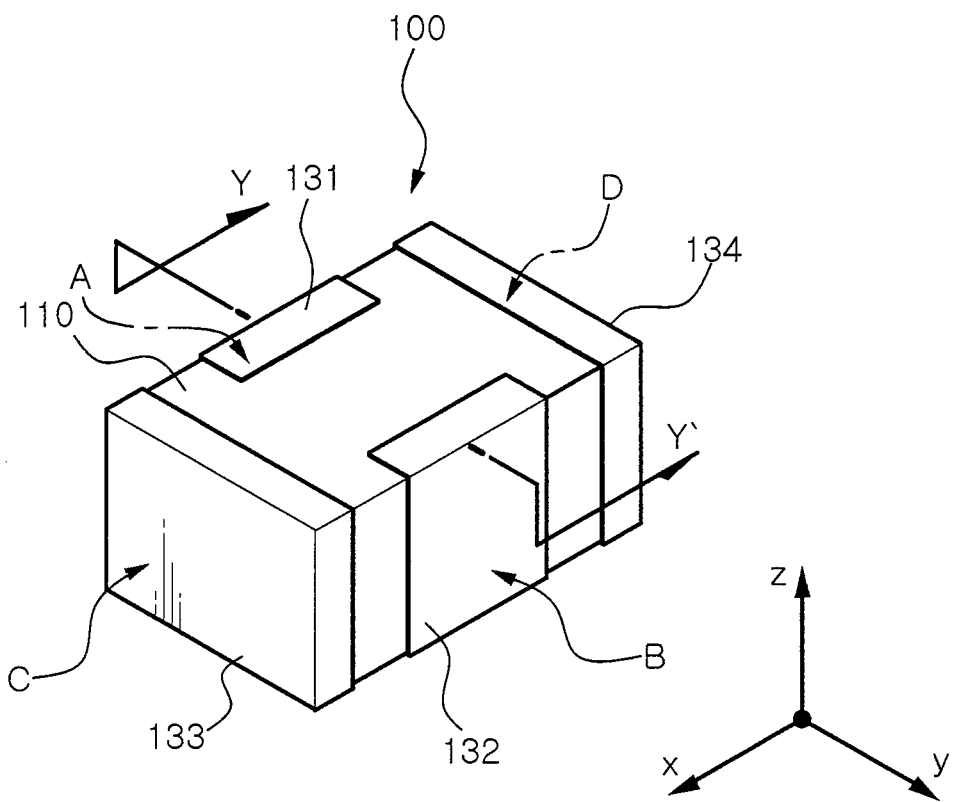
FIG. 1 is a perspective view of an exterior of a multilayer chip capacitor according to an exemplary embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout.

Figure 2:
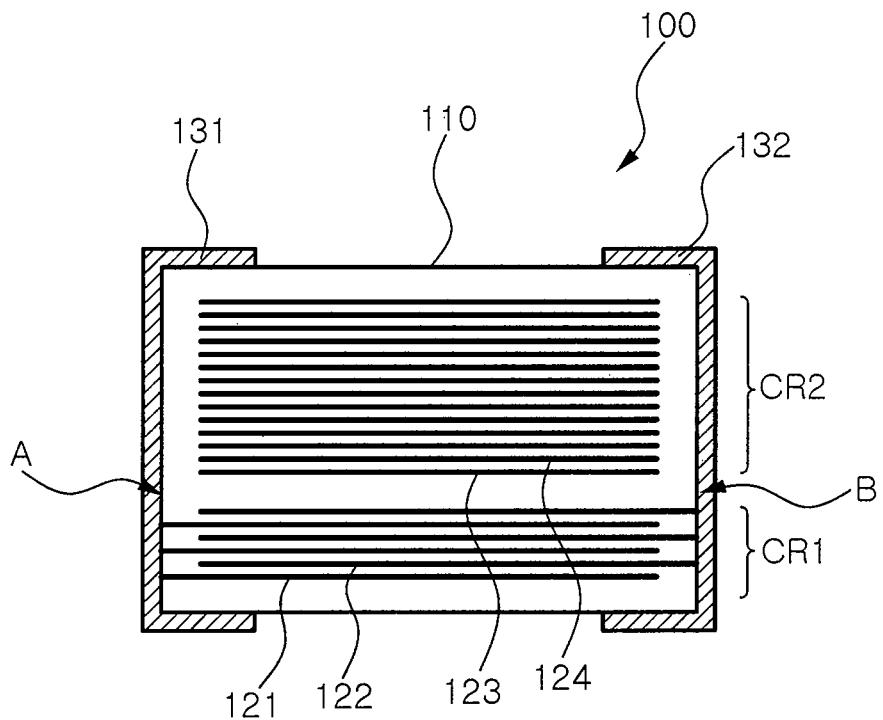
FIG. 2 is a cross-sectional view taken along line Y-Y' of FIG. 1.
Figure 3:
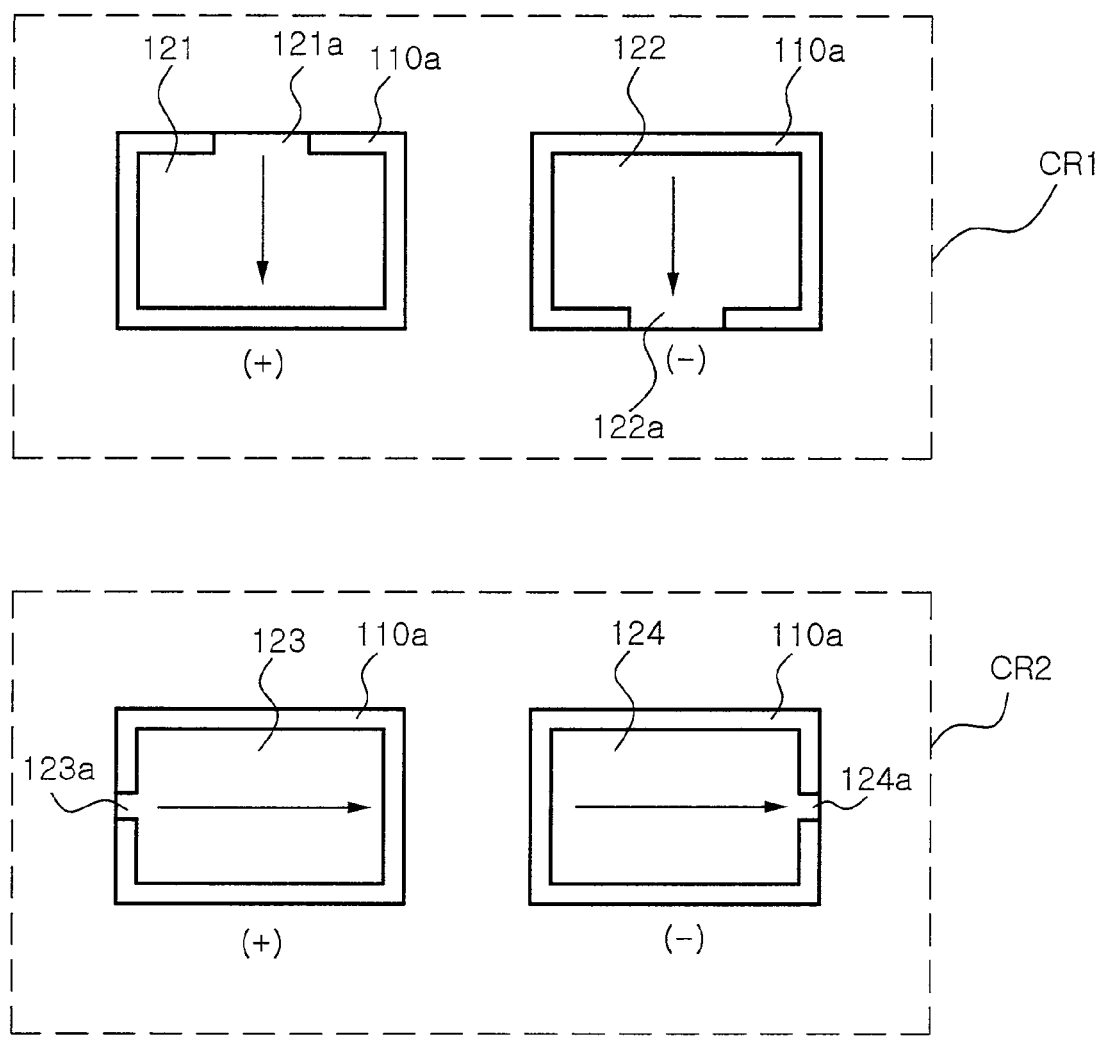
FIG. 3 is a plan view of an internal electrode structure of the multilayer chip capacitor of FIG. 1.

FIG. 1 is a perspective view of an exterior of a multilayer chip capacitor according to an exemplary embodiment of the present invention. FIG. 2 is a cross-sectional view taken along line Y-Y' of FIG. 1. FIG. 3 is a plan view of an internal electrode structure of the multilayer chip capacitor of FIG. 1.

Referring to FIGS. 1 through 3, a multilayer chip capacitor 100 includes a capacitor body 110, and external electrodes 131 to 134 (hereinafter, also referred to as first to fourth external electrodes) disposed on side faces of the capacitor body 110. The capacitor body 110 includes a stacked structure in which a plurality of dielectric layers 110a of FIG. 3 are stacked. In the capacitor body 110, a plurality of internal electrodes 121 to 124 (hereinafter, also referred to as first to fourth internal electrodes) are disposed, separated by the dielectric layers 110a. The first and second external electrodes 131 and 132 are respectively disposed on first and second longer side faces A and B of the capacitor body 110. The third and fourth external electrodes 133 and 134 are respectively disposed on first and second shorter side faces C and D of the capacitor body 110. The multilayer chip capacitor 100 corresponds to a 4-terminal capacitor having four external electrodes.

Referring to FIGS. 2 and 3, the capacitor body 110 includes a first capacitor part CR1 and a second capacitor part CR2 arranged in a stacked direction, i.e., a z-axial direction. The first capacitor part CR1 includes at least one pair of first and second internal electrodes 121 and 122 facing each other with the dielectric layer 110a located therebetween. The second capacitor part CR2 includes at least one pair of third and fourth internal electrodes 123 and 124 facing each other with the dielectric layer 110a located therebetween. The first internal electrode 121 and the second internal electrode 122 have opposite polarity. For example, the first internal electrode has positive (+) polarity, and the second internal electrode has negative (−) polarity. The third internal electrode 123 and the fourth internal electrode 124 also have opposite polarity. For example, the third internal electrode has positive polarity, and the fourth internal electrode has negative polarity.

As shown in FIG. 2, the first capacitor part CR1 is disposed at a lower end portion in the capacitor body 110, and the second capacitor part CR2 is disposed on the first capacitor part CR2. The lower end portion of the capacitor body 110 is located at a side close to a mounting surface in the case of mounting the multilayer capacitor 100 on a circuit board. An upper end portion of the capacitor body 110 corresponds to the opposite side to the lower end portion. When the multilayer chip capacitor 100 is mounted on the circuit board, the first capacitor part CR1 and the second capacitor part CR2 of the multilayer chip capacitor 100 are connected in parallel to each other by a line of an external circuit (e.g., a conductive pattern on a circuit board connected with an external electrode of a capacitor).

Referring to FIG. 3, in the first capacitor part CR1, leads 121a and 122a of the first and second internal electrodes 121 and 122 extend to the first and second longer side faces A and B to be connected to the first and second external electrodes 131 and 132, respectively. In the second capacitor part CR2, leads 123a and 124a of the third and fourth internal electrodes 123 and 124 extend to the first and second shorter side faces C and D to be connected to the third and fourth external electrodes 133 and 134, respectively. Accordingly, as shown in FIG. 3, a current path in the first and second internal electrodes 121 and 122 of the first capacitor part CR1 is shorter than a current path in the third and fourth internal electrodes 123 and 124 of the second capacitor part CR2. In FIG. 3, the current path of the first capacitor part CR1 is indicated by arrows in a short-side direction, and the current path of the second capacitor part CR2 is indicated by arrows in a long-side direction. Accordingly, the equivalent series inductance (ESL) per layer of the first capacitor part CR1 is lower than the ESL per layer of the second capacitor part CR2. Here, the ESL per layer refers to ESL provided by one pair of adjacent internal electrodes of opposite polarity, which face each other.

The first capacitor part CR1 having lower ESL per layer is disposed at a lower end portion in the capacitor body 110, and the second capacitor part CR2 is disposed on the first capacitor part CR2. Then, the current flowing in the multilayer chip capacitor 100 at a high frequency concentrates at the first and second electrodes 121 and 122 having low ESL per layer and disposed at the lower end portion. Thus, a substantial current path caused by a current loop is shortened, thereby further lowering the ESL of the entire multilayer chip capacitor 100.

Since the ESL of the first capacitor part CR1 is different from the ESL of the second capacitor part CR2, a series resonance frequency (SRF) of the first capacitor part CR1 is generally different from an SRF of the second capacitor part CR2. Particularly, the SRF of the first capacitor part CR1 having lower ESL may be made higher than the SRF of the second capacitor part CR2.

In the first capacitor part CR1, the first internal electrode 121 has only one lead 121a and the second internal electrode 122 also has only one lead 122a. The leads 121a and 122a have smaller lead widths than lengths of the long sides of the first and second internal electrodes 121 and 122, respectively. That is, each of the internal electrodes of the first capacitor part CR1 has only one lead having a width smaller than a length of a long side of the internal electrode, thereby contributing to an increase in the ESR (ESR1) of the first capacitor part CR1. The ESR1 of the first capacitor part CR1 can be controlled by changing the widths of the leads 121a and 122a and the number of the first and second internal electrodes 121 and 122 being stacked (i.e., the total number of internal electrodes in the first capacitor part CR1). As a width of a lead becomes smaller, a current path of a current flowing through the lead decreases in width, and thus the ESR is increased.

In the second capacitor part CR2, the third internal electrode 123 has only one lead 123a extending to the first shorter side face C, and the fourth internal electrode 124 also has only one lead 124a extending to the second shorter side face D. The leads 123a and 124a have widths smaller than lengths of short sides of the third and fourth internal electrodes 123 and 124, respectively. Each of the internal electrodes of the second capacitor part CR2 has only one lead which has a width smaller than a length of the short side of the internal electrode, thereby increasing the ESR (ESR2) of the second capacitor part CR2. Particularly, the second capacitor part CR2 disposed on the first capacitor part CR1 does not greatly affect the ESL of the entire multilayer chip capacitor 100 and has a relatively long current path in the third and fourth internal electrodes 123 and 124 (see the arrows in FIG. 3). This is advantageous in increasing the ESR2 of the second capacitor part CR2. The ESR2 of the second capacitor part CR2 can be controlled by controlling the widths of the leads 123a and 124a and the number of third and fourth internal electrodes 123 and 124 being stacked in the second capacitor part CR2.

If a difference between the ESR1 of the first capacitor part CR1 and the ESR2 of the second capacitor part CR2 is reduced in a state where the respective ESR1 and ESR2 of the first and second capacitor parts CR1 and CR2 have been increased, the ESR ($ESR_{total}$) of the entire multilayer chip capacitor 100 is further increased, and the rapid fluctuation in the impedance can be suppressed around the SRF.

Specifically, the ESR1 of the first capacitor part CR1 is controlled to be 20 mΩ or higher (i.e., ESR1>20 mΩ), and the difference between the ESR2 of the second capacitor part CR2 and the ESR1 of the first capacitor part CR1 is controlled to be 30% or less of the ESR (ESR1) of the first capacitor part CR1 (i.e., 07(ESR1)≦ESR2≦11.3 (ESR1)). Thus, the ESR of the entire multilayer chip capacitor 100 is increased, and the constant impedance magnitude of the multilayer chip capacitor 100 is maintained in a relatively wide frequency range including the SRF.

Particularly, to maintain the constant impedance, the ESR1 of the first capacitor part CR1 and the ESR2 of the second capacitor part CR2 may be controlled to be substantially equal to each other. In this case, the impedance magnitude corresponding to the SRF of the first capacitor part CR1 becomes almost equal to the impedance magnitude corresponding to the SRF of the second capacitor part CR2. Accordingly, the rapid fluctuation in impedance of the entire multilayer chip capacitor is suppressed, and the impedance is maintained constant in a relatively wide range from the SRF of the second capacitor part CR2 to the SRF of the first capacitor part CR1.

The multilayer chip capacitor 100 has a smaller number of terminals as compared to an existing 8-terminal or 10-terminal capacitor. For this reason, mounting of the multilayer chip capacitor 100 can be facilitated, and the ESR of the multilayer chip capacitor 100 can be further increased.

Figure 4:
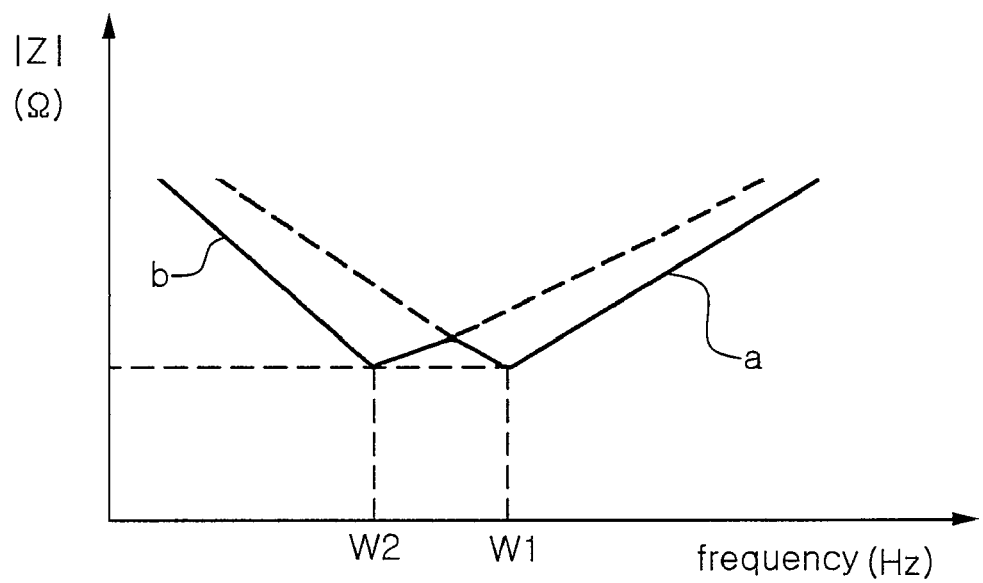
FIG. 4 is a graph showing a frequency characteristic with respect to the impedance of the multilayer chip capacitor of FIG. 1.

FIG. 4 is an exemplary graph of impedance vs. frequency characteristics of the multilayer chip capacitor 100. A horizontal axis of this graph represents frequency, and a vertical axis thereof represents the impedance magnitude |z|. In the graph of FIG. 4, curve 'a' may represent an impedance characteristic of the first capacitor part CR1 having a higher SRF, and curve 'b' may represent an impedance characteristic of the second capacitor part CR2 having a lower SRF. The curves 'a' and 'b' have their minimum points at the SRF W1 and the SRF W2, respectively. The impedance characteristic of the entire multilayer chip capacitor 100 including the first and second capacitor parts CR1 and CR2 connected together in parallel may be represented by a sold line of the curves 'a' and 'b'.

As shown in FIG. 4, since the ESR1 of the first capacitor part CR1 is substantially equal to the ESR2 of the second capacitor part CR2, the impedance magnitude |z| is the same at the respective SRFs W1 and W2 of the first and second capacitor parts CR1 and CR2. Accordingly, the low and almost constant impedance of the entire capacitor is maintained in a wide frequency region from the SRF W2 to the SRF W1.

Figure 5:
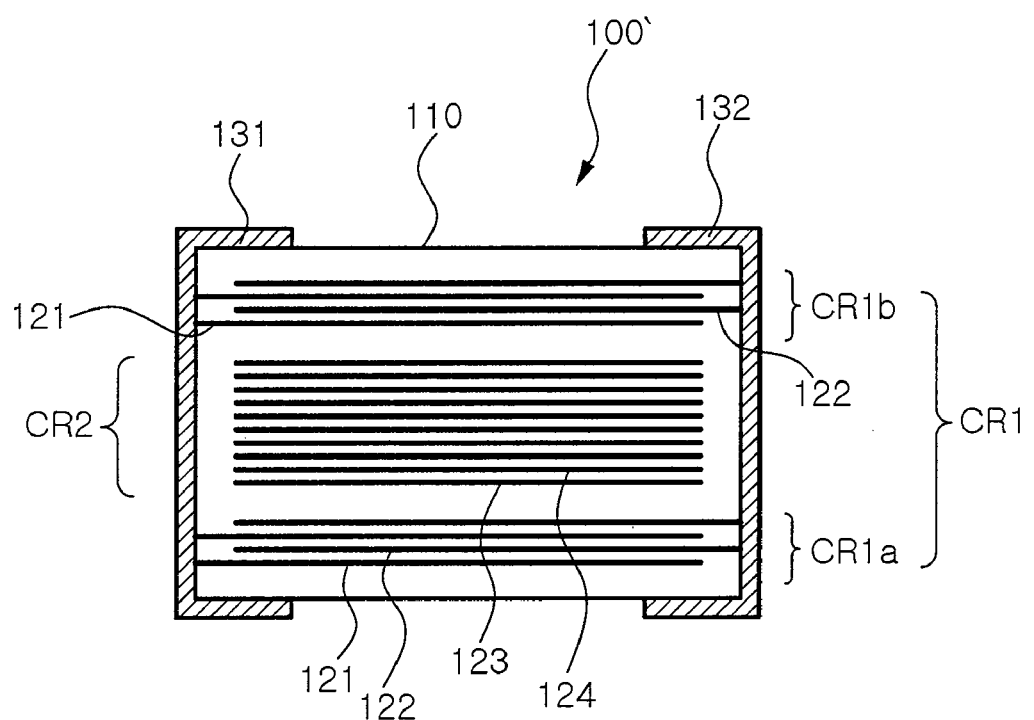
FIG. 5 is a cross-sectional view illustrating a modification version of the multilayer chip capacitor of FIG. 1.

FIG. 5 is a cross-sectional view of a modification version of the multilayer chip capacitor of FIG. 1, and may be compared with the cross-sectional view of FIG. 2. Referring to FIG. 5, the second capacitor part CR2 is disposed between portions CR1a and CR1b of the first capacitor part CR1. A multilayer chip capacitor 100 ' of FIG. 5 has the same exterior as the multilayer chip capacitor 100 of FIG. 1. For ease of description, the first capacitor part CR1 is described as being divided into the portion CR1a placed under the second capacitor part CR2 and the portion CR1b placed on the second capacitor part CR2.

The capacitor body 110 includes the first capacitor part CR1, and the second capacitor part CR2. The second capacitor part CR2 is disposed between the portions CR1a and CR1b of the first capacitor part CR1. The portion CR1a of the first capacitor part CR1, the second capacitor part CR2 and the portion CR1b of the first capacitor part CR1 are stacked in a stacked direction. Thus, the first capacitor part CR1 is placed under and on the second capacitor part CR2.

The first and second internal electrodes 121 and 122 described above with reference to FIG. 3 are disposed in each of the portions CR1a and CR1b of the first capacitor part CR1. The third and fourth internal electrodes 123 and 124 described above with reference to FIG. 3 are disposed in the second capacitor part CR2. The internal electrodes are stacked in the order of 121-122-121-122-. . . . -123-124-123-124-. . . . -121-122-121-122-. . . from an internal electrode closest to a mounting surface. Even in the current exemplary embodiment, the aforementioned ESR conditions of the first and second capacitor parts CR1 and CR2 (ERS1≧20 mΩ, 0.7 (ESR1)≦ESR2≦1.3 (ESR1)) are satisfied. Accordingly, the ESR of the entire multilayer chip capacitor 100 ' can be increased while the low and constant impedance is maintained over a relatively wide frequency range around the SRF.

The portions CR1a and CR1b of the first capacitor part CR1 are symmetrically disposed in the stacked direction, with the second capacitor part CR2 therebetween. Thus, upper and lower portions of the multilayer chip capacitor 100' are symmetrical to each other. Since the symmetry can be secured in mounting the multilayer chip capacitor 100', the multilayer chip capacitor 100' can be mounted on a mounting surface of a circuit board without distinguishing between a top face and a bottom face of the multilayer chip capacitor 100'.

Figure 6:
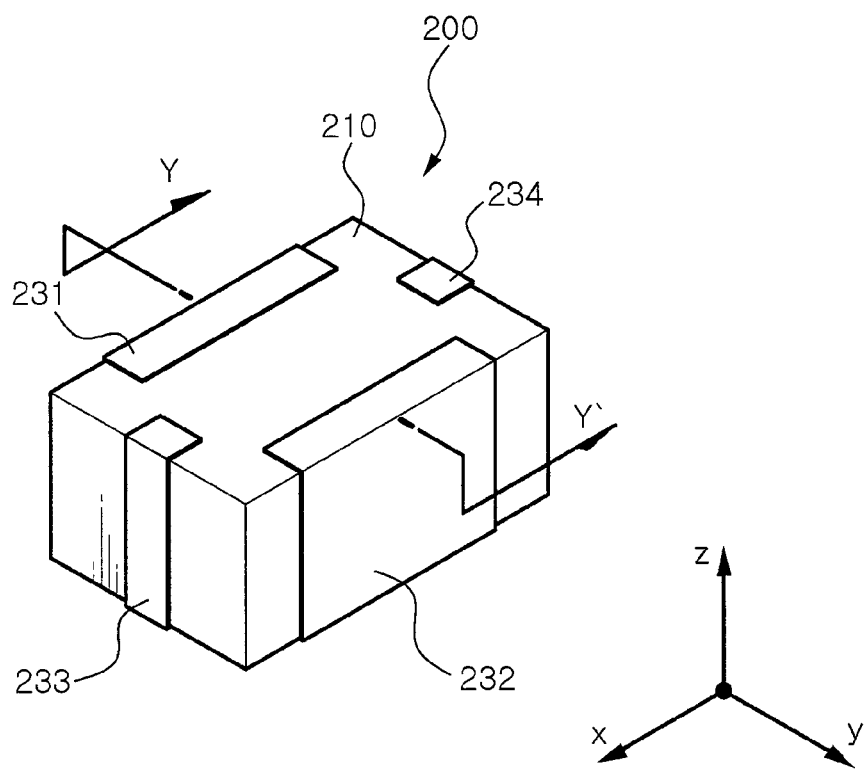
FIG. 6 is a perspective view of an exterior of a multilayer chip capacitor according to another exemplary embodiment of the present invention.
Figure 7:
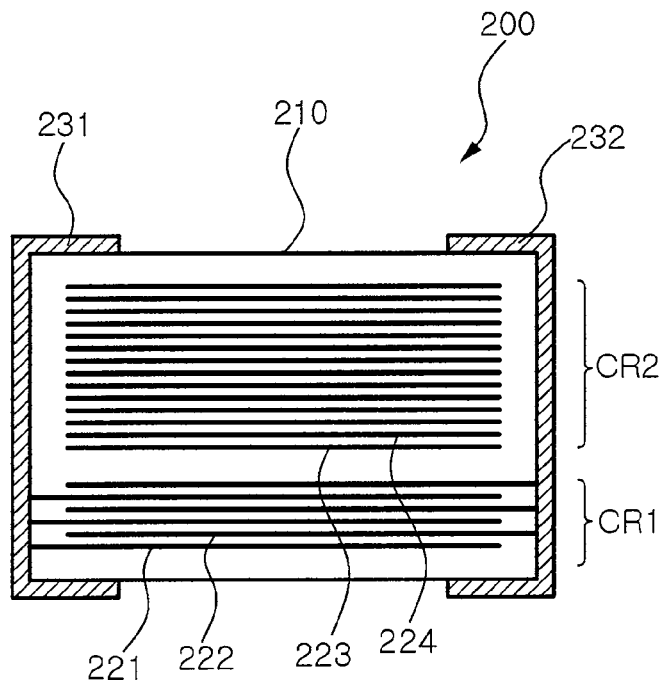
FIG. 7 is a cross-sectional view taken along line Y-Y' of FIG. 6.
Figure 8:
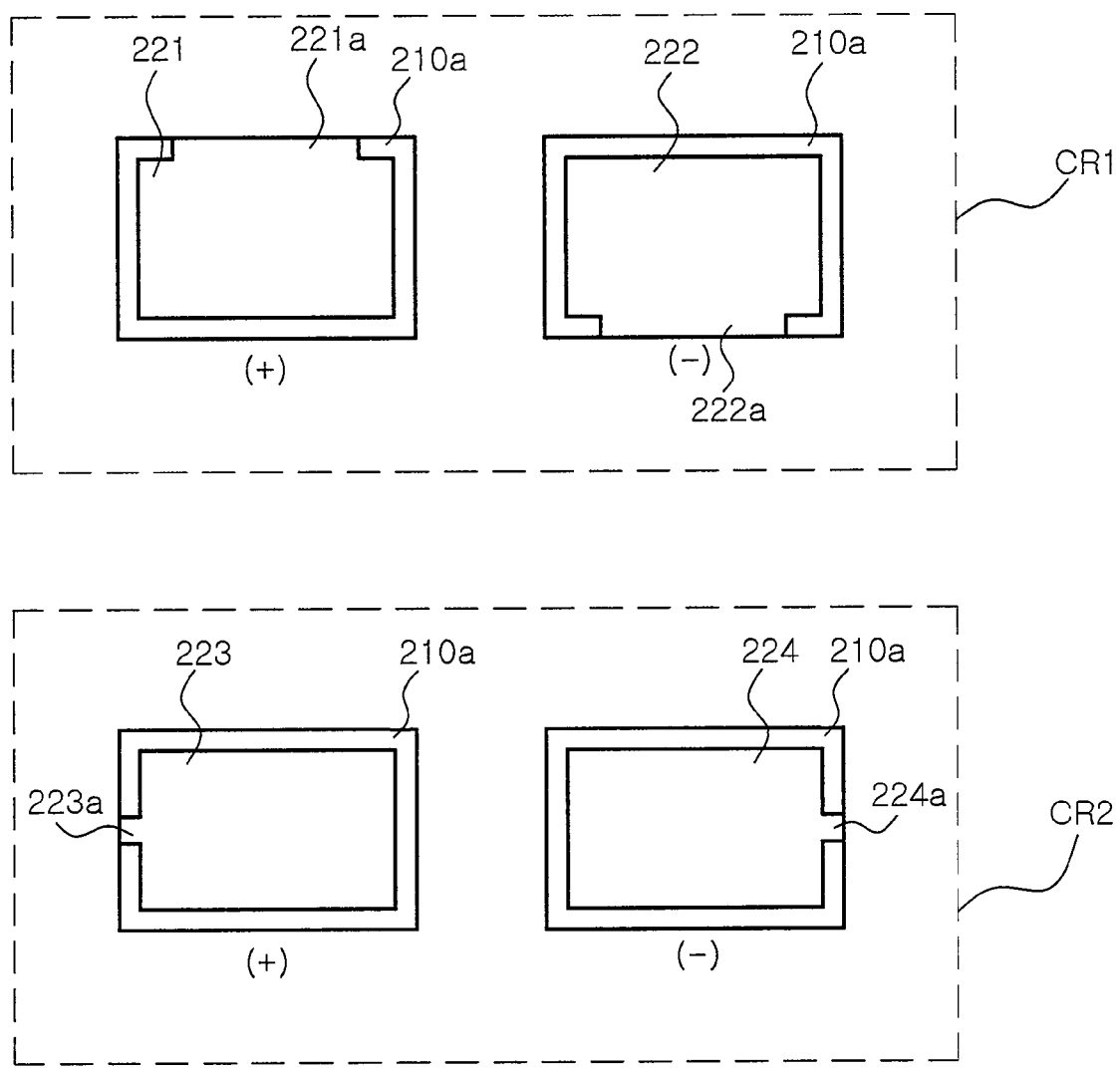
FIG. 8 is a cross-sectional view of an internal electrode structure of the multilayer chip capacitor of FIG. 6.

FIG. 6 is a perspective view of an exterior of a multilayer chip capacitor according to another exemplary embodiment of the present invention. FIG. 7 is a cross-sectional view taken along line Y-Y' of FIG. 6. FIG. 8 is a cross-sectional view of an internal electrode structure of the multilayer chip capacitor of FIG. 6. According to the current exemplary embodiment, respective leads 221a and 222a of internal electrodes of a first capacitor part CR1, and external electrodes 231 and 232 connected to the first capacitor part CR1 have greater widths than those in the previous embodiment of FIG. 3, in order to reduce the ESR of the multilayer chip capacitor.

A multilayer chip capacitor 200 includes a capacitor body 210, first and second external electrodes 231 and 232 respectively disposed on two longer side faces of the capacitor body 210, and third and fourth external electrodes 233 and 234 respectively disposed on two shorter side faces of the capacitor body 210. The capacitor body 210 includes a first capacitor part CR1 disposed at a lower portion therein, and a second capacitor part CR2 disposed on the first capacitor part CR1. In the first capacitor part CR1, first and second internal electrodes 221 and 222 of opposite polarity are alternately disposed, and a dielectric layer 210a is located between each alternate set of the first and second internal electrodes 221 and 222. In the second capacitor part CR2, third and fourth internal electrodes 223 and 224 of opposite polarity are alternately disposed, and a dielectric layer 210a is located between each alternate set of the third and fourth internal electrodes 223 and 224. The first and second internal electrodes 221 and 222 are connected to the first and second external electrodes 231 and 231 through the leads 221a and 222a, respectively. The third and fourth internal electrodes 223 and 224 are connected to the third and fourth external electrodes 233 and 234 through leads 223 a and 224 a, respectively.

Referring to FIGS. 6 and 8, the respective leads 221a and 222a of the first and second internal electrodes 221 and 222 have widths greater than in the previous embodiment of FIG. 3. Likewise, the first and second external electrodes 231 and 232 respectively connected to the leads 221a and 222a of the first and second internal electrodes 221 and 222 have widths greater than in the previous embodiment. However, as shown in FIG. 6, the third and fourth external electrodes 233 and 234 respectively cover only portions of the shorter side faces, not the entire shorter side faces (compare FIG. 6 to FIG. 1). Thus, short-circuit can be prevented between the first and second external electrodes 231 and 232 and the third and fourth external electrodes 233 and 234.

Also in the current exemplary embodiment, the aforementioned ESR conditions of the first and second capacitor parts CR1 and CR2 (ERS1≧20 mΩ, 0.7 (ESR1)≦ESR2≦1.3 (ESR1)) are satisfied. Accordingly, the ESR of the entire multilayer chip capacitor 200 can be increased while the low and constant impedance can be maintained over a relatively wide frequency range around the SRF. Particularly, in order to maintain the constant impedance, the ESR1 of the first capacitor part CR1 may be substantially equal to the ESR2 of the second capacitor part CR2.

The ESL of the first capacitor part CR1 greatly affecting the ESL of the entire multilayer chip capacitor 200 can be further lowered by further increasing the widths of the respective leads 221 and 222a of the internal electrodes of the first capacitor part CR1, and the widths of the respective first and second external electrodes 231 and 232 connected to the first capacitor part CR1. Thus, an increase in ESL of the multilayer chip capacitor 200 is further suppressed.

Figure 9:
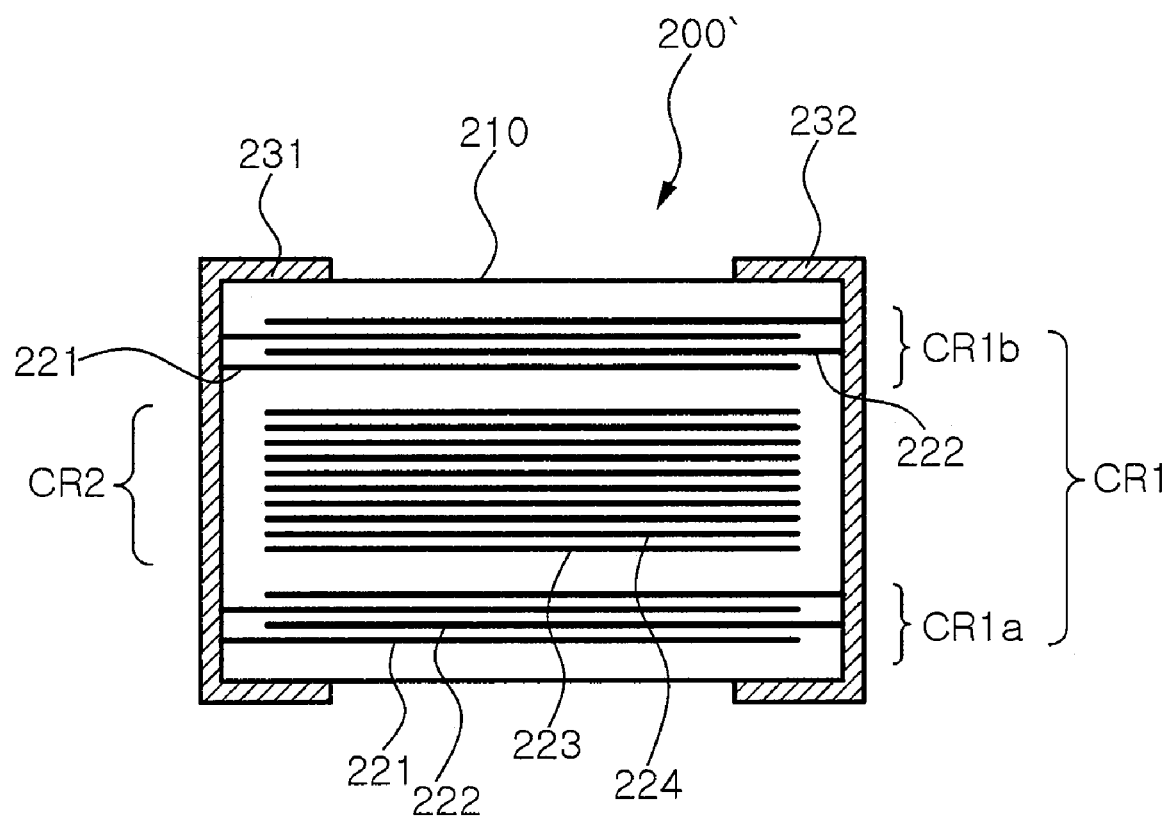
FIG. 9 is a cross-sectional view illustrating a modification version of the multilayer chip capacitor of FIG. 6.

FIG. 9 is a cross-sectional view of a modification version of the multilayer chip capacitor of FIG. 6, and may be compared with the cross-sectional view of FIG. 7. Referring to FIG. 9, the second capacitor part CR2 is disposed between portions of the first capacitor part CR1. A multilayer chip capacitor 200' of FIG. 9 has the same exterior as the multilayer chip capacitor of FIG. 6.

A capacitor body 210 includes a first capacitor part CR1 and a second capacitor part CR2. The second capacitor part CR2 is disposed between portions CR1a and CR1b of the first capacitor part CR1. The first capacitor part CR1 is located under and on the second capacitor part CR2. For ease of description, the first capacitor part CR1 may be described as being divided into the portion CR1a placed under the second capacitor part CR2 and the portion CR1b placed on the second capacitor part CR2. The portions CR1a and CR1b of the first capacitor part CR1 may be symmetrically disposed so as to implement a multilayer chip capacitor having upper and lower portions which are symmetrical to each other with the second capacitor part CR2 located therebetween. In this case, the multilayer chip capacitor 200' can be mounted on a circuit board without distinguishing between a top face and a bottom face of the multilayer chip capacitor 200'.

The first and second internal electrodes 221 and 222 described above with reference to FIG. 8 are disposed in each of the portions CR1a and CR1b of the first capacitor part CR1. The third and fourth internal electrodes 223 and 224 described above with reference to FIG. 8 are disposed in the second capacitor part CR2. Also in the current exemplary embodiment, the ESR conditions (ERS1≧20 mΩ, 0.7 (ESR1)≦ESR2≦1.3 (ESR1)) of the first and second capacitor parts CR1 and CR2 are satisfied. Accordingly, the ESR of the entire multilayer chip capacitor 200' can be increased while the low and constant impedance is maintained over a relatively wide frequency range around the SRF.

An experimental example for showing characteristic improvements of the multilayer chip capacitor according to the present invention will now be described.

The experiment example shows results of measuring the ESR and ESL of a related art 2-terminal capacitor and a capacitor according to an embodiment of the present invention. A capacitor sample of the embodiment ('Embodiment' in Table 1 below) corresponds to the multilayer chip capacitor 100' of FIG. 5. A comparison capacitor sample ('Comparison example' in Table 1 below) for comparison with the capacitor sample of the embodiment corresponds to a related art 2-terminal low inductance chip capacitor (LICC). In the capacitor sample of the embodiment, the ESR conditions (ERS1≧20 mΩ, 0.7 (ESR1)≦ESR2≦1.3 (ESR1)) of the first and second capacitor parts CR1 and CR2 are satisfied, and the ESR1 and the ESR2 are substantially equal to each other. The capacitance of both the capacitor samples is set to 1.0 μF. The ESR values and the ESL values of the capacitor samples are shown in Table 1 below:

TABLE 1

| Characteristic | Capacitance | ESL | ESR |
| --- | --- | --- | --- |
| Comparison example (related art LICC) | 1.0 μF | 114 pH | 5.9 mohm |
| Embodiment | 1.0 μF | 157 pH | 35.7 mohm |

As shown in Table 1 above, the entire ESL of the embodiment is slightly higher than that of the comparison example, but the entire ESR of the embodiment is six times higher than that of the comparison example. Thus, according to the present invention, the ESR of the entire multilayer chip capacitor is increased, and the low and constant impedance can be maintained over a relatively wide frequency region.

According to the present invention, the ESR of a capacitor is controllable and the low ESL is maintained. Also, the low and constant impedance of a power distribution network can be maintained in a wide frequency range.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer chip capacitor, comprising:
a capacitor body having first and second longer side faces facing each other and first and second shorter side faces facing each other, having a stacked structure in which a plurality of dielectric layers are stacked, and including a first capacitor part and a second capacitor part stacked in a stacked direction;
a first external electrode and a second external electrode, respectively formed on the first and second longer side faces and having opposing polarities; and
a third external electrode and a fourth external electrode, respectively formed on the first and second shorter side faces and having opposing polarities,
wherein the first capacitor part includes a first internal electrode and a second internal electrode, having opposing polarities and facing each other with the dielectric layer interposed therebetween, the first internal electrode having only one lead, the only one lead of the first internal electrode extending to only the first longer side face, the second internal electrode having only one lead, the only one lead of the second internal electrode extending to the second longer side face,
the second capacitor part includes a third internal electrode and a fourth internal electrode, having opposing polarities and facing each other with the dielectric layer interposed therebetween, the third internal electrode having only one lead, the only one lead of the third internal electrode extending to the first shorter side face, the fourth internal electrode having only one lead, the only one lead of the fourth internal electrode extending to the second shorter side face,
wherein the first and second external electrodes are respectively connected to the leads of the first and second internal electrodes of the first capacitor part, and the third and fourth external electrodes are respectively connected to the leads of the third and fourth internal electrodes of the second capacitor part, and
a series resonance frequency of the first capacitor part is different from a series resonance frequency of the second capacitor part, and equivalent series resistance (ESR1) of the first capacitor part and equivalent series resistance (ESR2) of the second capacitor part satisfy ERS1≧20 mΩ, and 0.7 (ESR1)≦ESR2≦1.3 (ESR1).

2. The multilayer chip capacitor of claim 1, wherein the equivalent series resistance of the first capacitor part is substantially equal to the equivalent series resistance of the second capacitor part.

3. The multilayer chip capacitor of claim 1, wherein the first capacitor part is disposed at a lower end in the capacitor body, and the second capacitor part is disposed on the first capacitor part.

4. The multilayer chip capacitor of claim 1, wherein the first capacitor part has portions respectively disposed at upper and lower ends within the capacitor body, and the second capacitor part is disposed between the portions of the first capacitor part.

5. The multilayer chip capacitor of claim 4, wherein the portions of the first capacitor part are symmetrically disposed in the stacked direction with the second capacitor part located therebetween, and the multilayer chip capacitor has upper and lower portions which are symmetrical to each other.

6. The multilayer chip capacitor of claim 1, wherein equivalent series inductance per layer provided by one facing set of the first and second internal electrodes within the first capacitor part is smaller than equivalent series inductance per layer provided by one facing set of the third and fourth internal electrodes within the second capacitor part.

* * * * *